US 6,718,121 B1

(12) United States Patent
Shikunami (10) Patent No.: US 6,718,121 B1
(45) Date of Patent: Apr. 6, 2004

(54) INFORMATION SIGNAL PROCESSING APPARATUS USING A VARIABLE COMPRESSION RATE IN ACCORDANCE WITH CONTENTS OF INFORMATION SIGNALS

(75) Inventor: Juichi Shikunami, Kanagawa-ken (JP)

(73) Assignee: Victor Company of Japan, Limited, Yokohama (JP)

( * ) Notice: Subject to any disclaimer, the term of this patent is extended or adjusted under 35 U.S.C. 154(b) by 0 days.

(21) Appl. No.: 09/437,814

(22) Filed: Nov. 10, 1999

(30) Foreign Application Priority Data

Nov. 13, 1998 (JP) ............................... 10-324156
Jun. 25, 1999 (JP) ............................... 11-180465

(51) Int. Cl.[7] ................................................ H04N 7/26
(52) U.S. Cl. ....................................... 386/109; 386/112
(58) Field of Search ................................. 386/109, 111, 386/112, 27, 33, 46, 1, 124, 125, 45, 40, 104, 96, 39; 348/384.1, 387.1, 390.1; H04N 7/26

(56) References Cited

U.S. PATENT DOCUMENTS 5,576,758 A * 11/1996 Arai et al.

FOREIGN PATENT DOCUMENTS

| EP | 0 802 682 | 10/1997 |
|---|---|---|
| EP | 0 825 782 | 2/1998 |
| JP | 8235676 | 9/1996 |
| JP | 8289244 | 11/1996 |
| JP | 08-289244 | 11/1996 |
| JP | 10164577 | 6/1998 |
| JP | 10172269 | 6/1998 |

* cited by examiner

Primary Examiner—Robert Chevalier
(74) Attorney, Agent, or Firm—Nath & Associates PLLC; Marvin C. Berkowitz

(57) ABSTRACT

A video disk recorder is such an apparatus as to compresses a video signal contained in a television signal at a predetermined compression rate to record it on an optical disk, and then play back the recorded signal. In such a video disk recorder, the television signal being input into a signal inputting portion is then compressed by a variable-rate encoder, and then sent out to a recording/playing portion. The signal sent out to the recording/playing portion is then recorded on an optical disk. In particular, the video disk recorder has a probability calculating portion for weighting signals according to degree of importance of the contents of the television signals, and a controlling portion for varying the compression rate in compliance with the weight.

8 Claims, 7 Drawing Sheets

| TIME | PROBABILITY OF BEING PROGRAM |
|---|---|
| ~0:14:10 | 1 |
| 0:14:10~ | 0.9 |
| 0:14:30~ | 0.3 |
| 0:15:00~ | 0 |
| 0:15:15~ | 0 |
| 0:15:30~ | 0 |
| 0:15:45~ | 0 |
| 0:16:00~ | 0.5 |
| 0:16:20~ | 1 |

FIG. 7A

| PROBABILITY OF BEING PROGRAM | RECORDING AVERAGE RATE | OVERWRITE PRIORITY |
|---|---|---|
| 0 | 2 Mbps | 1 |
| 0.1 ~ 0.3 | 2 | 2 |
| 0.4 ~ 0.5 | 3 | — |
| 0.6 ~ 1 | 4 | — |

FIG. 7B

| PROBABILITY OF BEING PROGRAM | RECORDING AVERAGE RATE | PLAYING SPEED |
|---|---|---|
| 0 | 2 Mbps | 15 TIMES |
| 0.1 ~ 0.3 | 2 | 3 |
| 0.4 ~ 0.5 | 3 | 1 |
| 0.6 ~ 1 | 4 | 1 |

FIG. 8

INFORMATION SIGNAL PROCESSING APPARATUS USING A VARIABLE COMPRESSION RATE IN ACCORDANCE WITH CONTENTS OF INFORMATION SIGNALS

BACKGROUND OF THE INVENTION

1. Field of the Invention

The present invention relates to an information signal processing apparatus which records/plays-back information signals consisting of image and audio signals onto/of a recording medium such as DVD, etc. and, more particularly, a video disk recorder, etc. which are able to compress video information at a predetermined rate based on a compression variable conversion rate system such as MPEG (Moving Picture Experts Group) to record them, and play back the recorded signals.

2. Description of the Prior Art

In recent years, there are information signal processing (recording/playing) apparatuses such as a DVD system, which can compress the information signals such as the television signals via the MPEG compression variable conversion rate system, for example, to record them, and then play back the recorded signals. The DVD system records the information signals on the optical disk, which has a diameter of 12 cm and a recording capacity of 4.7 GB, via the variable rate system. Since such DVD system enables a large capacity recording and is excellent in so-called random access property, it has such an advantage that such DVD system can record/play back quickly a desired location of the recording region.

Then, normally the information signal processing (recording/ playing) apparatus of this type has a mode of playing back the ROM DVD optical disk on which particular information have been recorded in advance. However, a mode of recording the information signal such as the television signal in real time is now researched and developed actively.

Figure 1:
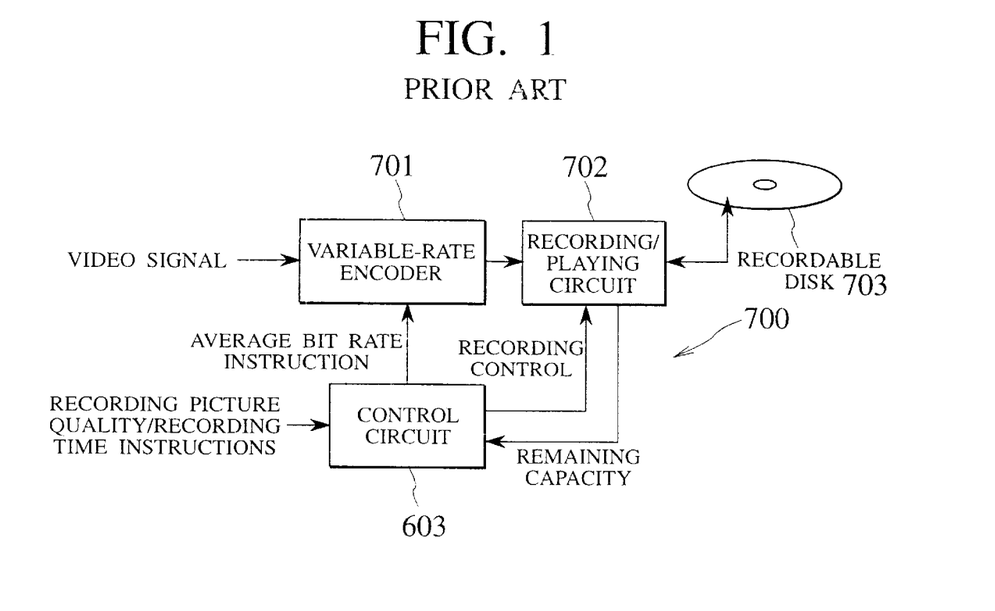
FIG. 1 is a block diagram showing schematically a configuration of a video disk recorder in the prior art.

FIG. 1 is a block diagram showing schematically a video disk recorder 700 having the compression variable conversion rate system in the prior art. As shown in FIG. 1, in this video disk recorder 700, the externally input video signal is compressed by a variable-rate encoder 701, and then recorded on a recordable disk 703 via a recording/playing circuit 702. Meanwhile, a control circuit 603 controls the variable-rate encoder 701 and the recording/playing circuit 702 according to a level of the recording picture quality and the recording time which are instructed by the user.

In the video disk recorder 700 in the prior art, the control circuit 603 changes a compression rate of the image, which is given by the variable-rate encoder 701, depending upon complexity of the contents of the input images and quickness of the motion of the subject to thus enable large-capacity and high quality picture recording. In more detail, the control circuit 603 increases the compression rate to lower the bit rate of the signals which are sent out to the recording/playing circuit 702 if either the contents of the video signal is monotonous or the motion of the subject is small, while the control circuit 603 decreases the compression rate to enhance the bit rate if either the image on the screen is complicated or the subject moves quickly.

However, if so-called real time coding recording by which the program portion of the TV program is recorded in real time, for example, is effected by using the above video disk recorder 700 in the prior art, it is difficult to forecast the succeeding development of the program contents. Therefore, there is such a problem that a remaining capacity of the optical disk 703 and the compression rate of the image cannot be properly balanced. For example, as shown in FIG. 2, when a 60-minute program is now recorded, the program has been recorded for 50 minutes after the start of the program while compressing the program at the average bit rate of 4 Mbps, nevertheless it is difficult to forecast the future development of the program contents at the time point of remaining 10 minutes.

Figure 2:
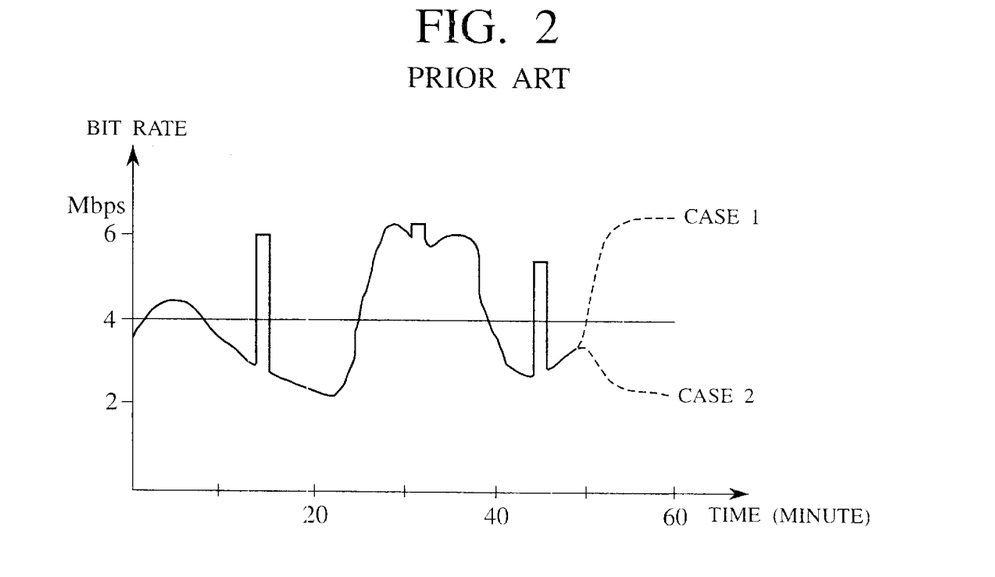
FIG. 2 is a graph showing change in a bit rate relative to time when a television signal is recorded in the prior art.

More particularly, it is difficult to forecast whether to increase the bit rate like the case 1 in FIG. 2 since the program content reaches its climax within the remaining 10 minute and thus the image on the screen is complicated or the motion of the subject becomes quick, or to decrease the bit rate like the case 2 in FIG. 2 since the program content becomes quiet during the remaining 10 minute and thus the image becomes monotonous or the motion of the subject becomes slow.

Accordingly, it is impossible to decide the optimum compression rate by the real time coding recording. In order to compensate this, the technology for deciding a target coding amount of the succeeding screen based on the complexities of the past and current screens (Patent Application Publication (KOKAI) Hei 10-164577), and the technology for estimating the recordable remaining time (Patent Application Publication (KOKAI) Hei 10-172269) have been developed in the prior art.

However, these technologies decide the compression rate basically according to, the forecast. Therefore, if the forecast was wrong, the remaining capacity of the optical disk becomes small although the program has not yet ended. Thus, even if the program content reaches its climax and thus the image on the screen is complicated or the motion of the subject becomes quick, the DVD system cannot but increase the compression rate in order to lower the bit rate. As a result, there is a possibility that degradation of the picture quality is resulted in.

Meanwhile, upon recording, playing, and dubbing the television broadcasting, normally the commercial is the to-be-cut subject for most of the viewers. However, it is hard to discriminate between the program portion and the commercial portion of the TV program without fail. For this reason, the method of discriminating between the program portion and the commercial portion in view of the length of the soundless portion and the interval time between the soundless portions is disclosed in Patent Application Publication (KOKAI) Hei 8-235676, and the method of employing a plurality of detecting processes and then evaluating detected results based on the fuzzy logic is disclosed in Patent Application Publication (KOKAI) Hei 8-289244. Moreover, it has been widely known that the optical disk is excellent in the random access property.

SUMMARY OF THE INVENTION

The present invention has been made in view of the above circumstance in the prior art, and it is an object of the present invention to provide an information signal processing apparatus which can improve recording quality of a video signal on an optical disk by correlating an output of an information evaluating portion, which can weight information signals according to a degree of importance of the contents of the information signals, with a target value of a coding average rate, which is supplied to a variable-rate encoder.

It is another object of the present invention to provide an information signal processing apparatus which can overwrite new information signals on commercial portions, etc., which have a relatively low importance in program contents, with the use of a random access property of the optical disk, and can practically use the recording capacity at its maximum by utilizing effectively recording regions of a recording medium such as DVD, etc. to thus enable the high picture quality video recording.

It is still another object of the present invention to provide an information signal processing apparatus which can record a probability of being program (or commercial) evaluated in recording in a memory or on the recording medium and then employ the probability to control a player at the time of play back.

In order to achieve the above objects, there is provided an information signal processing apparatus comprising: an information evaluating portion for weighting individually information signals which are input sequentially according to contents of the information signals; a controlling portion for generating compression rates for respective information signals according to corresponding weights and outputting the compression rates; a compressing portion for compressing input information signals based on the corresponding compression rates generated by the controlling portion; and a recording portion for recording the information signals which are compressed by the compressing portion on a recording medium.

In the preferred embodiment of the present invention, the information evaluating portion weights heavily the information signals according to a higher degree of importance of the contents of the information signals respectively, and the controlling portion generates lower compression rates according to heaviness of the weights respectively.

In the preferred embodiment of the present invention, the information signals are television signals, the information evaluating portion weights more heavily the television signals according to height of probability of not being commercial respectively, and the controlling portion generates lower compression rates according to heaviness of weights respectively.

According to the above configuration of the present invention, the compression rate of the unimportant portion such as the commercial can be increased to reduce an amount of information when such unimportant portion is recorded on the recording medium, while the compression rate of the important portion of the television signals such as the program can be decreased when such important portion is recorded on the recording medium. Therefore, the capacity of the recording medium can be effectively utilized while achieving improvement of the picture quality.

The preferred embodiment of the present invention further comprises a storing portion for storing sequentially the weights to correspond to the information signals respectively, wherein the controlling portion controls the recording portion to overwrite new information signals on locations of the recording medium, in which the information signals have already been recorded, based on the weights stored in the storing portion.

The preferred embodiment of the present invention further comprises a storing portion for storing sequentially the weights to correspond to the information signals respectively, wherein the controlling portion controls the recording portion to overwrite new information signals on locations of the recording medium, in which the information signals have already been recorded, in an order of lower corresponding weights stored in the storing portion.

The preferred embodiment of the present invention further comprises a storing portion for storing sequentially the weights to correspond to the television signals respectively, wherein the controlling portion controls the recording portion to overwrite new television signals on locations of the recording medium, in which the television signals have already been recorded, in an order of lower corresponding weights stored in the storing portion.

According to the above configuration of the present invention, since the important information signal can be overwritten on the regions in which the unimportant information signal has already been recorded when the capacity of the recording medium lacks during recording the signals on the recording medium in real time, the remaining important information signal can be recorded without degradation of the picture quality. At that time, in the case of the television signal, for example, the information signal is overwritten on the regions which has a high possibility that the commercial is recorded therein. Accordingly, the capacity of the recording medium can be utilized more effectively. If the recording medium consists of the optical disk which has a random access property, the television signal can be played back smoothly when such television signal is recorded discontinuously.

The preferred embodiment of the present invention further comprises a sound volume detecting portion for detecting sound volume of audio signals included in the television signals; and a soundless portion detecting portion for detecting a soundless portion of the audio signals, wherein the information evaluating portion estimates a probability of not being commercial of the television signals based on results detected by the sound volume, detecting portion and the soundless portion detecting portion.

The preferred embodiment of the present invention further comprises a frame information analyzing portion for analyzing frame information of the video signals included in the television signals; and a luminance distribution analyzing portion for analyzing luminance distribution of the video signals, wherein the information evaluating portion estimates a probability of not being commercial of the television signals based on results analyzed by the frame information analyzing portion and the luminance distribution analyzing portion.

The preferred embodiment of the present invention further comprises a storing portion for storing sequentially the weights to correspond to the information signals respectively; and a playing portion for playing back the information signals which are recorded on the recording medium at a variable speed in accordance with corresponding weights stored in the storing portion.

The preferred embodiment of the present invention further comprises a storing portion for storing sequentially the weights to correspond to the television signals respectively; and a playing portion for playing back the television signals which are recorded on the recording medium at a variable speed in accordance with corresponding weights stored in the storing portion.

According to the above configuration of the present invention, the important portion of the television signals such as the program can be played back at a low speed, whereas the unimportant portion such as the commercial can be played back at a high speed. Therefore, the information signal can be played back effectively.

The nature, principle and utility of the invention will become more apparent from the following detailed description when read in conjunction with the accompanying drawings.

DESCRIPTION OF THE PREFERRED EMBODIMENT

Figure 3:
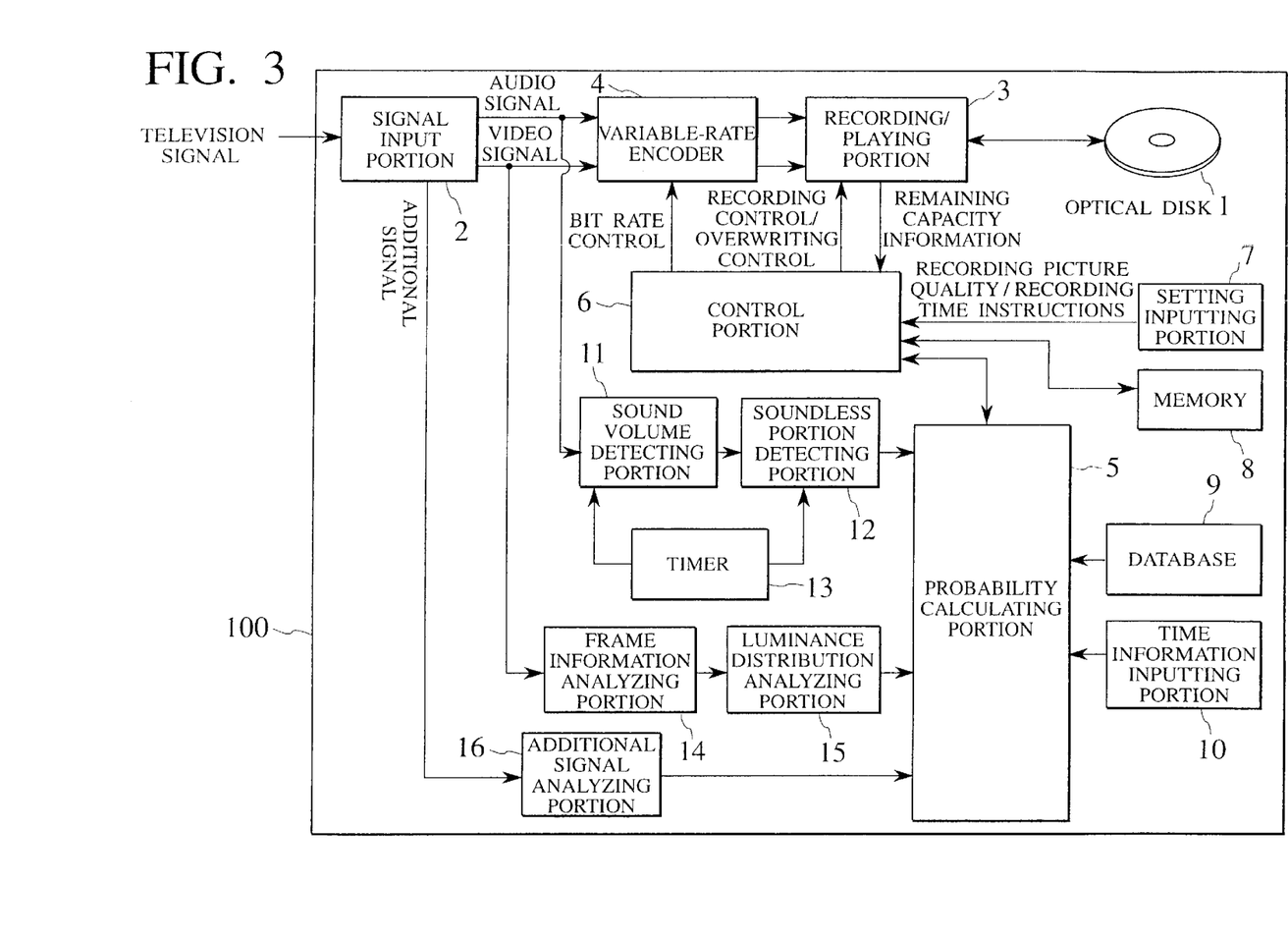
FIG. 3 is a block diagram showing schematically an overall configuration of a video disk recorder according to an embodiment of the present invention.

An embodiment of the present invention will be explained in detail with reference to the accompanying drawings hereinafter. FIG. 3 shows a video disk recorder 100 according to the embodiment of the present invention. In FIG. 3, the video disk recorder 100 compresses a video signal and an audio signal contained in a television signal at a predetermined compression rate, then records them on an optical disk 1, and then plays back recorded signals.

Overall Configuration of the Video Disk Recorder 100

In the present embodiment, the video disk recorder 100 comprises a signal input portion 2 into which a television signal is input, a recording/playing portion 3 for recording/playing back information onto/of an optical disk 1, a variable-rate encoder 4 for encoding the television signal, and a control portion (controlling portion) 6 for controlling operations of above portions. Also, the video disk recorder 100 has a probability calculating portion (information evaluating portion) 5 for weighting the television signal in a multi-level fashion in accordance with the degree of importance of the content of the television signal.

Then, in the video disk recorder 100, the television signal being input into the signal input portion 2 is separated into a audio signal, a video signal, and an additional signal by the signal input portion 2. Then, the audio signal and the video signal are compressed by the variable-rate encoder 4 and then sent out to the recording/playing portion 3. The audio signal and the video signal being sent out to the recording/playing portion 3 are then recorded on the optical disk 1. In this case, in the present embodiment, the television signal is input into the signal input portion 2 as an analogue signal, and then is A/D-converted into a digital signal by the signal input portion 2. Therefore, the television signal is processed as the digital signal in the video disk recorder 100.

Variable-rate Encoder 4

Figure 4:
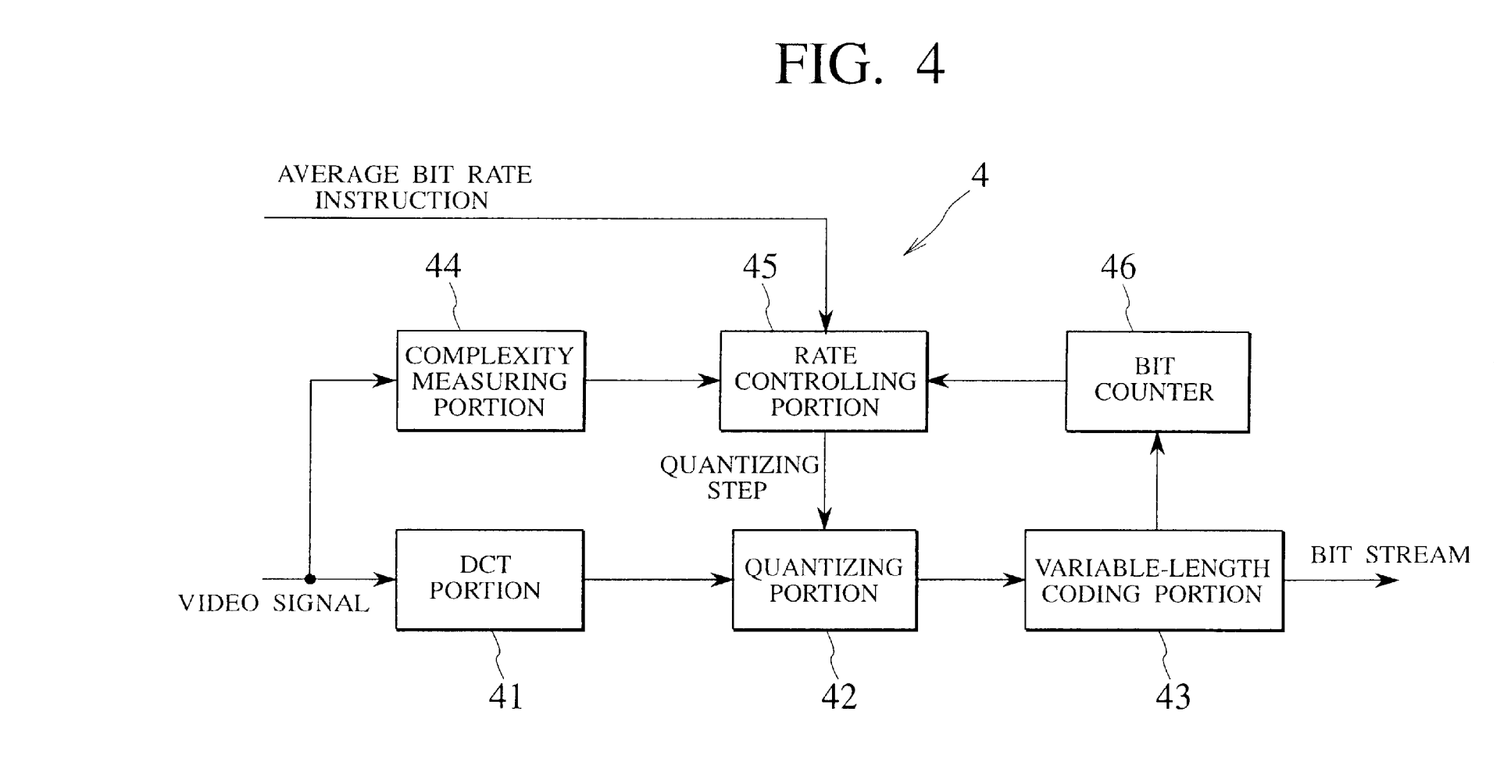
FIG. 4 is a block diagram showing schematically a configuration of a variable-rate encoder according to the present embodiment.

Well-known encoders may be employed as the above variable-rate encoder 4. For instance, the variable-rate encoder 4 compresses the audio signal and the video signal in a digital fashion based on the compression variable conversion rate system such as MPEG 2. The variable-rate encoder 4 changes a compression rate based on the average bit rate instruction being input from the control portion 6. FIG. 4 is a block diagram showing schematically an operation of compressing the video signal in the variable-rate encoder 4 according to the present embodiment.

In FIG. 4, the variable-rate encoder 4 comprises a DCT (Discrete Cosine Transform) portion, 41 for transforming the input video signal by the cosine transformation, a quantizing portion 42 for quantizing the signal which has been subjected to the cosine transformation, a variable-length coding portion 43 for coding the quantized signal, a complexity measuring portion 44 for measuring the complexity of the input video signal, a bit counter 46 for counting the bit number of the signal which is coded by the variable-length coding portion 43, and a rate controlling portion 45 for controlling the quantizing step (compression rate) in the quantizing portion 42. As the variable-rate encoder 4, an encoder which has a pixel-number converting function may be employed.

In the variable-rate encoder 4 having the above configuration, the input video signal is transformed via the cosine transformation by the DCT portion 41, and then the complexity of the content of the video signals is measured by the complexity measuring portion 44. Then, the complexity measured by the complexity measuring portion 44 is sent out to the rate controlling portion 45. Then, the rate controlling portion 45 decides the quantizing step in the quantizing portion 42, based on an average bit rate instruction sent out from the control portion 6, the complexity sent out from the complexity measuring portion 44, and an amount of bit sent out from the bit counter 46, and then sends out such quantizing step to the quantizing portion 42.

The quantizing portion 42 quantizes the signal which has been subjected to the cosine transformation by the DCT portion 41, based on the quantizing step sent out from the rate controlling portion 45 and then sends out the quantized signal to the variable-length coding portion 43. The quantized signal sent out to the variable-length coding portion 43 is then sent out to the recording/playing portion 3 as a bit stream. An amount of bit of this coded signal or this bit stream is counted up by the bit counter 46, and then this information is sent out to the rate controlling portion 45.

Recording/playing Portion 3, Control Portion 6

Based on a recording control signal and an overwriting control signal supplied from the control portion 6, the recording/playing portion 3 records/plays back the video signal and the audio signal on/of a DVD optical disk which has a diameter of 12 cm and a recording capacity of 4.7 GB, for example. The control portion 6 controls operations of the recording/playing portion 3 and the variable-rate encoder 4 based on a "probability of being program (or CM)" calculated by the probability calculating portion 5, "recording picture quality/ recording time instructions" input from a setting inputting portion 7, "optical disk remaining capacity information" sent out from the recording/playing portion 3, etc.

In this case, the setting inputting portion 7 is used by the user to selectively input the recording picture quality information and the recording time information. The control portion 6 calculates the recording picture quality and the recording time based on the recordable remaining capacity of the optical disk 1, and then informs the user of them by a display means (not shown). Then, the user selects the recording picture quality and the recording time within the informed range by using the setting inputting portion 7.

More particularly, the video disk recorder 100 in the present embodiment has a "high quality picture mode", a "standard quality picture mode", a "long time recording mode", and a "recording time setting mode", all can be selected by the user. The "high quality picture mode" is a mode in which a compression rate is set low to improve the picture quality but the recording time is made short. The "standard quality picture mode" is a mode in which the recording picture quality and the recording time are balanced to be kept at a standard level. The "long time recording mode" is a mode in which the recording time is set preferentially and the compression rate is then set to attain the recording time. The "recording time setting mode" is a mode in which the compression rate is set to mate with the recording time which is set by the user.

Then, the mode setting selected by the user is sent out to the control portion 6. Then, the control portion 6 calculates the recording average bit rate according to respective modes and then gives this average bit rate to the variable-rate encoder 4. The information needed in respective controls which are conducted in the control portion 6 are stored in a memory 8 on a time series basis.

Probability Calculating Portion 5

Based on change in features of the audio signal and the video signal, and an additional signal contained in the television signal, the probability calculating portion 5 decides that the content of the television signal corresponds to which of the program portion and the commercial portion, and then calculates the above "probability of being program (or CM)".

Here, as the change in features of the audio signal, change in the sound volume caused when the TV program is switched from the program to the commercial, generation of the soundless portion between the program and the commercial or the commercial and the commercial, change between monoral/stereo/bilingual sound modes when the TV program is switched from the program to the commercial, or the like may be considered. In the present embodiment, the change in features of the audio signal is detected by a sound volume detecting portion 11 and a soundless portion detecting portion 12.

More particularly, an increase in the sound volume at the time of the commercial is detected by the sound volume detecting portion 11, and a length of the soundless portion and an interval between the soundless portions is detected by the soundless portion detecting portion 12. For example, a level of the sound volume is increased in most cases when the TV program is switched from the program to the commercial, or the soundless portion of about 0.2 seconds is generated before and after the commercial, or normally a length of the commercial is set to 15 seconds or 30 seconds. In this case, the length of the time during the sound volume become increased, the length of the soundless portion and the interval between the soundless portions are counted by a timer 13.

In addition, as the change in features of the video signal, change in the aspect ratio of the screen when the TV program is switched from the program to the commercial, change in the luminance of the screen, etc. may be considered. In the present embodiment, the change in features of the video signal is analyzed and detected by a frame information analyzing portion 14 and a luminance distribution analyzing portion 15. More particularly, the aspect ratio of the image contained in the video signal is detected frame by frame by the frame information analyzing portion 14, and change in the luminance distribution and the chromatic dispersion of the screen caused when the TV program is switched from the program to the commercial is detected by the luminance distribution analyzing portion 15.

Furthermore, in the present embodiment, change in features of the additional signal contained in the television signal is also analyzed and detected. As such additional signal, for example, a VPS signal for instructing the stereo sound, other text information, etc. may be considered.

Then, in order to calculate the "probability of being program (or CM)" by using the probability calculating portion 5, change patterns of the video signal, the audio signal, and the additional signal are detected every frame in accordance with the progress of the TV program, then times when the change patterns are detected are acquired from a time information inputting portion 10, then detected patterns are compared with patterns which are accumulated in a database 9, and then the probability of being program of each signal is calculated.

After time zones in respective broadcasting channels, in which the commercial is broadcasted, are checked and then changes in the patterns of the video signal and the audio signal of the commercial in respective time zones are compiled statistically, such changes in the patterns are stored as data in the database 9. Also, data of the commercial patterns according to a day of the week or the season may be contained in the database 9. For instance, difference of the patterns between the weekday and the holiday, difference of the patterns in the long-time program provided in the program reorganization period, etc., difference of the patterns in the period such as the sports program during when the commercial is inserted irregularly, etc. may be formulated as data.

Calculating Process for "Probability of Being Program (or CM)"

Figure 5:
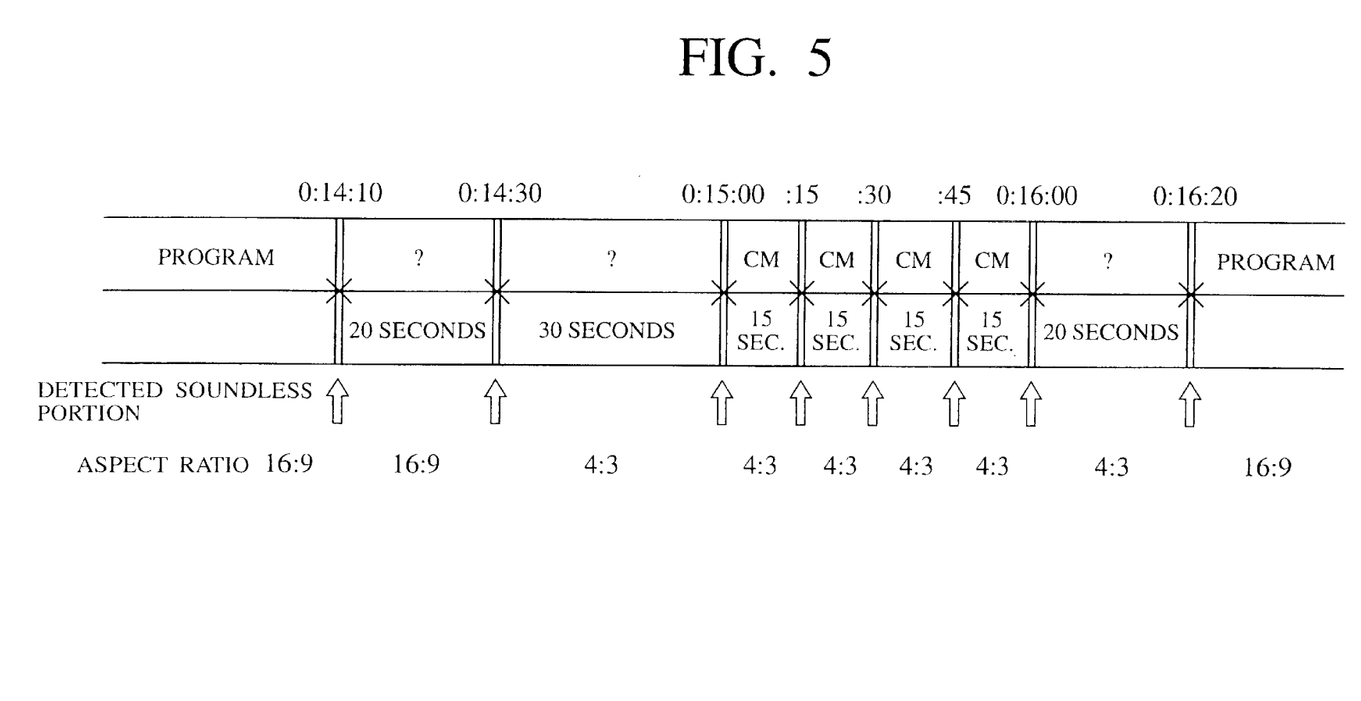
FIG. 5 is a time chart showing procedures of detecting a soundless portion and an aspect ratio of a television signal in the present embodiment.
Figure 6:
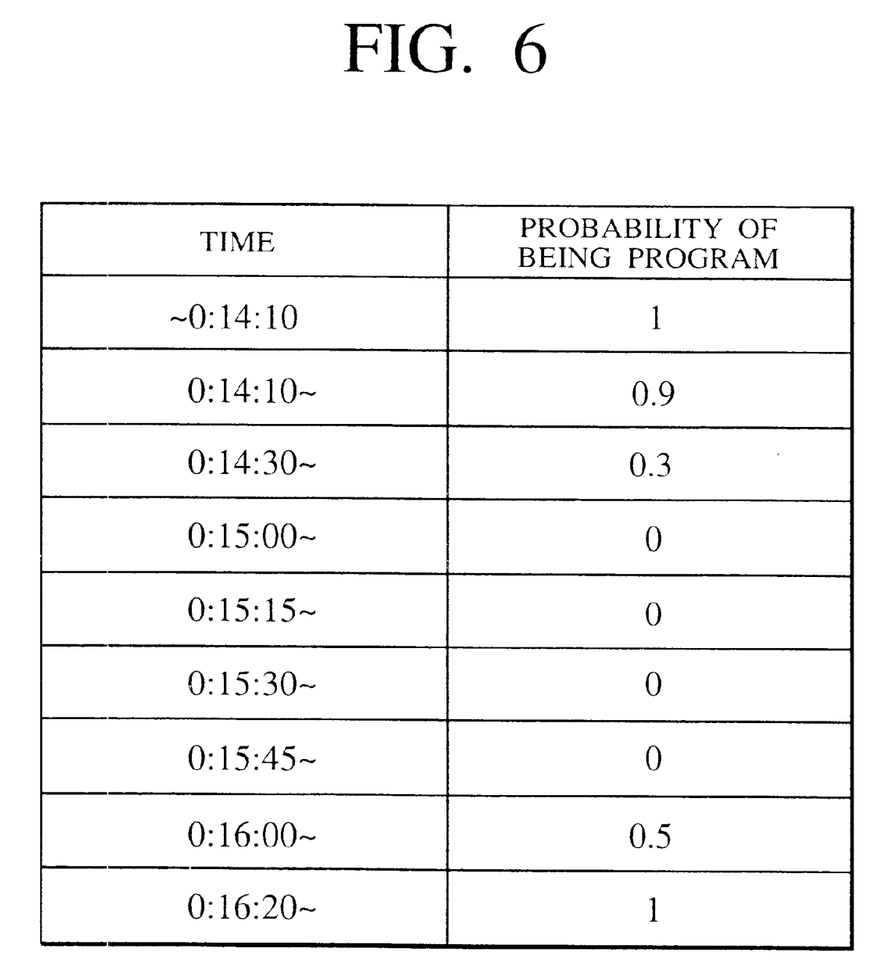
FIG. 6 is a table showing a distribution of a probability of being a program, which is detected according to the time chart shown in FIG. 5, relative to time.

Concrete procedures of detecting the "probability of being program (or CM)" are shown in FIG. 5 and FIG. 6. As an example, the case where the "probability of being program (or CM)" is detected based on detection of the soundless portion and analysis of the aspect ratio of the video signal is shown in FIG. 5 and FIG. 6.

First, as shown in FIG. 5, with the progress of the time, the soundless portion and the frame information are detected or analyzed from the video signal and the audio signal by the soundless portion detecting portion 12 and the frame information analyzing portion 14. As a result, change patterns of the features of respective signals are detected. In the example shown in FIG. 5, during the time period from 0:14:10 to 0:16:20, eight soundless portions are detected in total and the aspect ratio is changed twice.

Since the soundless portion is periodically generated on every change of the commercial in the commercial portion, there is a high probability that such time period from 0:15:00 to 0:16:00 is occupied by the commercial. In contrast, since the soundless portion is not periodically generated during the time period other than 0:15:00 to 0:16:00, it is not possible to decide unconditionally that such time period is occupied by the commercial portion. In addition, in the case that the content of the TV program is occupied by the cinema broadcasting, the broadcasting mode is switched from the cinema mode to normal mode when the TV program is switched from the program to the commercial, so that the aspect ratio is changed in many cases. Accordingly, it is possible to say that, during the time period from 0:14:10 to 0:16:20, the switching from the program to the commercial has happened with a high probability.

Then, based on the date and time information acquired from the time information inputting portion 10, the probability calculating portion 5 compares the detected patterns with the patterns accumulated in the database. In other words, the probability calculating portion 5 analyzes the degree of coincidence between these patterns, then evaluates the detected patterns stepwise according to the degree of coincidence, and then calculates the "probability of being program (or CM)". FIG. 6 shows the calculation result in which such a probability that the content of the television signal consists of the program is calculated based on the detected result shown in FIG. 5. According to FIG. 6, it is decided that the time period from 0:15:00 to 0:16:00 is occupied by the commercial at almost 100%, and the "probability of being program" is increased as the time is separated forward or backward from this time period.

In order to calculate such "probability of being program (or CM)", the method using the fuzzy logic disclosed in Patent Application Publication (KOKAI) Hei 8-289244, for example, may be employed. That is to say, respective features (the length of the soundless portion, the interval between the soundless portions, the aspect ratio, etc.) detected from the above video and audio signals, etc. are assigned as a set of variables each having a predetermined argument domain, then function domains for the features are defined in these argument domains respectively, and then this set of variables serving as a fuzzy set are evaluated by using a fuzzy rule. In this case, a trapezoidal function (membership function) containing a triangle and a rectangle may be employed as the functions defined in the argument domains.

If the "probability of being program (or CM)" is detected by using the fuzzy logic in this manner, a plurality of features can be prepared as models collectively in good balance and also appropriate setting can be learned every time of use. In addition, the definition for detecting the commercial can be set by the ambiguous expression, for example, such that "the commercial is provided for 15 seconds or 30 seconds, the soundless portion of about 0.2 second is set before and after the commercial, and the aspect ratio is sometimes changed". As a result of them, for example, even in case the feature patterns used to detect the commercial are different depending upon countries, regions, seasons, etc., proper settings can be achieved by causing the video disk recorder 100 to learn the settings according to the situations respectively, without requesting the user to perform complicated operations.

Average Rate Deciding Process

Figure 7A:
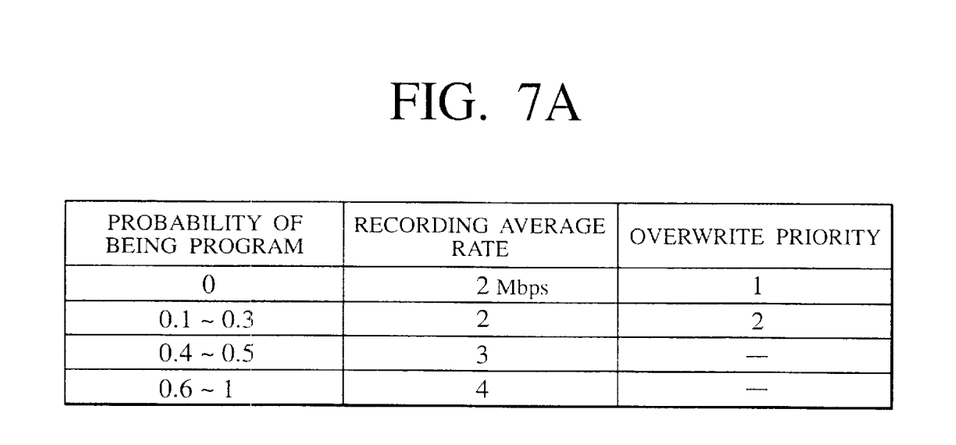
FIG. 7A is a table showing relationships among the probability of being the program, a recording average rate, an overwrite priority in the present embodiment.

The control portion 6 decides the bit rate based on the "probability of being program (or CM)" calculated by the probability calculating portion 5. In the present embodiment, as shown in FIG. 7A, the probability of being program, i.e., the probability of not being commercial, is classified into four stages of 0, 0.1 to 0.3, 0.4 to 0.5, and 0.6 to 1, and then the recording average rate instruction is weighted into three stages of 2, 3, and 4 Mbps. Then, the recording average rate is decided based on the correspondence shown in the first and second columns in FIG. 7A, and then this recording average rate is sent out to the variable-rate encoder 4.

In this way, since different weights can be given to the average rate instructions, an amount of data can be reduced by decreasing the bit rate in the commercial portion and also degradation of the picture quality can be prevented by increasing the bit rate in the program portion. As a result, while achieving improvement of the picture quality, the capacity of the optical disk 1 can be effectively utilized.

Operation in an Overwrite Mode

Furthermore, in the video disk recorder 100 according to the present embodiment, the overwrite mode can be selected to record the information as much as possible. In other words, in the video disk recorder 100 according to the present embodiment, a distribution of the "probability of being program (or CM)" which is detected from the television signal according to the above procedures is stored in the memory 8, and then new information signals are overwritten on locations of the optical disk 1, on which the television signal has already been recorded, based on the "probability of being program (or CM)" stored in the memory 8. In this case, the distribution of the "probability of being program (or CM)" may be recorded on the optical disk 1.

In more detail, as shown in the third column in FIG. 7A, overwrite priority is calculated based on the "probability of being program (or CM)" detected frame by frame according to the above procedures, and then such overwrite priority is stored in the memory 8 or the optical disk 1. More particularly, the new television signal is overwritten preferentially on the commercial portion, whose contents are not relatively important, out of the recorded television signal.

In the example shown in FIG. 7A, the location where the probability of being program is set to 0 is set as the region of the overwrite priority 1, and the overwrite priority 2 is given to the location where the probability of being program is set to 0.1 to 0.3. Then, when the remaining capacity of the optical disk 1 becomes small, first new information are recorded in the region of the overwrite priority 1. Then, if the region of the overwrite priority 1 lacks the sufficient capacity, the region of the overwrite priority 2 is employed.

Figure 8:
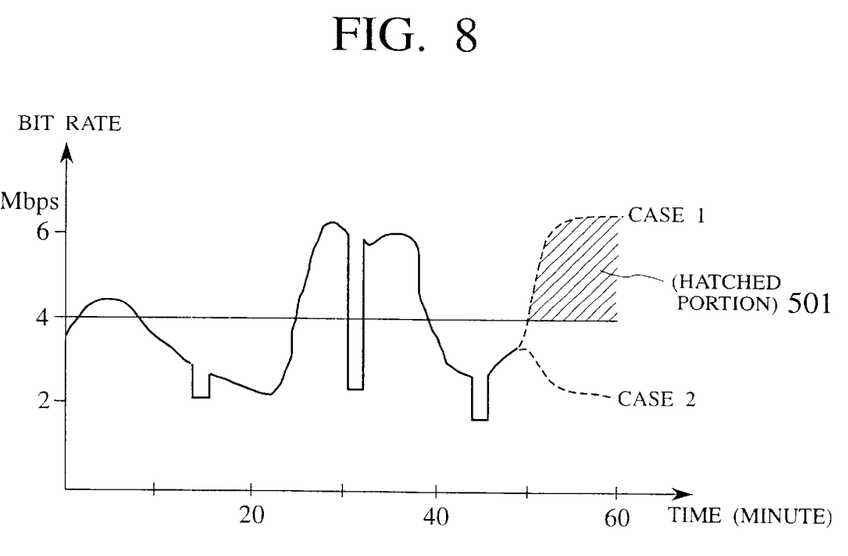
FIG. 8 is a graph showing change in the bit rate relative to time when the television signal is recorded in the present embodiment.

FIG. 8 shows an example of change in the bit rate stored in the memory 8. In FIG. 8, the case is shown where an information signal is recorded for a desired time which is decided for the optical disk 1 having a predetermined capacity. More particularly, assume that the optical disk 1 has the capacity to record the information for 60 minutes at the average bit rate of 4 Mbps.

Because the degree of coding difficulty of the image is unknown for 50 to 60 minutes after 50 minutes has lapsed in real time, any of a case 1 and a case 2 in FIG. 8 may be expected. If the remaining capacity should be assured in the case 1, the average bit rate in the time period from 0 to 50 minute must be set low. In contrast, if the remaining capacity should be assured in the case 2, the average bit rate in the time period from 0 to 50 minute can be set high, but in many cases desired quality cannot be achieved in the time period from 50 to 60 minute.

Therefore, in the present embodiment, first the recording is advanced at the average bit rate of 4 Mbps in the time period from 0 to 50 minute. Then, if the degree of coding difficulty is increased higher than the average in the time period from 50 to 60 minute since the input images become complicated rather than the average and motions of the image become quick and thus the encoder output has the bit rate as shown in a hatched portion 501, the overwriting operation is carried out on the commercial portion (regions of the overwrite priority 1 or 2).

According to such overwrite mode, since the program portion can be overwritten on the region where the commercial has already been recorded, the event that the recording regions of the optical disk 1 are occupied by unnecessary information signals such as the commercial can be avoided, so that the capacity of the optical disk 1 can be more effectively utilized. Also, in this case, the recorded television signal becomes discontinuous in view of the point of the arrangement on the recording medium. In the present embodiment, because of the random access property of the optical disk, the optical disk 1 can play back the recorded information smoothly so as not to allow the user to feel such discontinuity.

Playing-back Operation

In the foregoing embodiment, the probability that the content of the television signal consists of the program (or the commercial) is calculated in recording to control the recording rate. Further, it can be easily implemented that the probability values are recorded on the recording medium to correspond to the recorded programs. For example, it is preferable that areas which are read at first in the playing operation, like TOC (Table Of Contents) of the CD, should be employed as the recording locations.

In the playing-back operation conducted when the TV program is watched while cutting the commercial, the video disk recorder 100 in the present embodiment controls to play back quickly the region which has a low probability of being the program at the quick speed rate but play back the region which has a middle probability of being the program at the speed rate which is lower than the above quick speed rate.

Figure 7B:
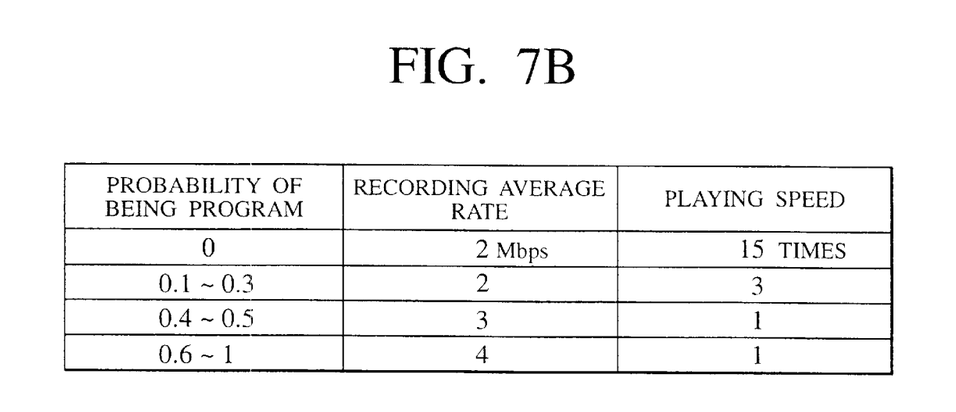
FIG. 7B is a table showing an example of a playing speed of a player.

An example of the playing speed is shown in FIG. 7B. According to such playing speed control, while using the existing technology which contains incompleteness to detect the commercial, the playing-back operation for satisfying substantially the commercial cut, as desired by the user, can be implemented.

Variation

In the present embodiment, the television signal being input into the signal input portion 2 is A/D-converted by the signal input portion 2. However, the present invention is not limited to this example. For instance, in the case that the input signal is the already-compressed signal, the present invention can also be adopted. More specifically, the signal which is input in its compressed state may be processed such that the input signal is decoded once to decode to the video signal. In this case, the present invention can be accomplished even if the input compressed signal is not completely decoded but the variable-rate encoder is employed as a rate converter which receives the compressed signal and outputs another compressed signal.

As described above, according to the information signal recording/playing apparatus of the present invention, since the compression rate of the information signal and overwriting locations of the recording medium can be decided appropriately according to the degree of importance of the program contents, the recording capacity can be practically used at its maximum by utilizing effectively the recording region of the recording medium such as DVD, etc., and thus the high quality picture images can be recorded or played back.

It should be understood that many modifications and adaptations of the invention will become apparent to those skilled in the art and it is intended to encompass such obvious modifications and changes in the scope of the claims appended hereto.

What is claimed is:

1. An information signal processing apparatus comprising:

an information evaluating portion for weighting individually information signals which are input sequentially according to contents of the information signals;

a controlling portion for generating compression rates for respective information signals according to corresponding weights and outputting the compression rates;

a compressing portion for compressing input information signals based on the corresponding compression rates generated by the controlling portion; and a recording portion for recording the information signals which are compressed by the compressing portion on a recording medium, wherein the information signals are television signals, and the information evaluating portion weights more heavily the television signals according to height of probability of not being commercial respectively, and the controlling portion generates lower compression rates according to heaviness of weights respectively.

2. An information signal processing apparatus comprising:

an information evaluating portion for weighting individually information signals which are input sequentially according to contents of the information signals;

a controlling portion for generating compression rates for respective information signals according to corresponding weights and outputting the compression rates;

a compressing portion for compressing input information signals based on the corresponding compression rates generated by the controlling portion;

a recording portion for recording the information signals which are compressed by the compressing portion on a recording medium; and a storing portion for storing sequentially the weights to correspond to the information signals respectively, wherein the controlling portion controls the recording portion to overwrite new information signals on locations of the recording medium, in which the information signals have already been recorded, based on the weights stored in the storing portion.

3. An information signal processing apparatus comprising:

an information evaluating portion for weighting individually information signals which are input sequentially according to contents of the information signals;

a controlling portion for generating compression rates for respective information signals according to corresponding weights and outputting the compression rates;

a compressing portion for compressing input information signals based on the corresponding compression rates generated by the controlling portion;

a recording portion for recording the information signals which are compressed by the compressing portion on a recording medium; and a storing portion for storing sequentially the weights to correspond to the information signals respectively, wherein the information signals are television signals, and the information evaluating portion weights more heavily the television signals according to height of probability of not being commercial respectively, and the controlling portion generates lower compression rates according to heaviness of weights respectively, and wherein the controlling portion controls the recording portion to overwrite new television signals on locations of the recording medium, in which the television signals have already been recorded, in an order of lower corresponding weights stored in the storing portion.

4. An information signal processing apparatus according to claim 1, further comprising a storing portion for storing sequentially the weights to correspond to the television signals respectively, wherein the controlling portion controls the recording portion to overwrite new television signals on locations of the recording medium, in which the television signals have already been recorded, in an order of lower corresponding weights stored in the storing portion.

5. An information signal processing apparatus according to claim 1, further comprising a sound volume detecting portion for detecting sound volume of audio signals included in the television signals, and a soundless portion detecting portion for detecting a soundless portion of the audio signals, wherein the information evaluating portion estimates a probability of not being commercial of the television signals based on results detected by the sound volume detecting portion and the soundless portion detecting portion.

6. An information signal processing apparatus according to claim 1, further comprising a frame information analyzing portion for analyzing frame information of the video signals included in the television signals, and a luminance distribution analyzing portion for analyzing luminance distribution of the video signals, wherein the information evaluating portion estimates a probability of not being commercial of the television signals based on results analyzed by the frame information analyzing portion and the luminance distribution analyzing portion.

7. An information signal processing apparatus comprising:

an information evaluating portion for weighting individually information signals which are input sequentially according to contents of the information signals;

a controlling portion for generating compression rates for respective information signals according to corresponding weights and outputting the compression rates;

a compressing portion for compressing input information signals based on the corresponding compression rates generated by the controlling portion;

a recording portion for recording the information signals which are compressed by the compressing portion on a recording medium;

a storing portion for storing sequentially the weights to correspond to the information signals respectively; and a playing portion for playing back the information signals which are recorded on the recording medium at a variable speed in accordance with corresponding weights stored in the storing portion.

8. An information signal processing apparatus according to claim 1, further comprising a storing portion for storing sequentially the weights to correspond to the television signals respectively; and a playing portion for playing back the television signals which are recorded on the recording medium at a variable speed in accordance with corresponding weights stored in the storing portion.

* * * * *